Feb. 20, 1968   E. J. TAFT   3,369,580
CUTTING APPARATUS
Filed June 14, 1967   2 Sheets-Sheet 2

INVENTOR.
EDWARD J. TAFT
BY
Richard P. Crowley
ATTORNEY

3,369,580
CUTTING APPARATUS
Edward Joseph Taft, 27 Sargeant St.,
Holyoke, Mass. 01040
Filed June 14, 1967, Ser. No. 646,004
10 Claims. (Cl. 143—16)

ABSTRACT OF THE DISCLOSURE

An improved cutting device for producing a series of semi-circular tubular segments for use as pipe insulation. The cutting device employs a series of oscillating semi-circular cutting blades which are formed and fitted to an arcuate shaped plate. The plate is characterized by a series of parallel arcuate grooves on the surface for insertion of the blades, and further characterized by a plurality of slots in which fastening devices are inserted. The plate is received to a means to impart oscillatory motion to the plate and blades.

The grooved plate is shaped to less than about a 150° circular segment so that on oscillation of the plate, about the axis of rotation, the ends of the plate do not project above the cutting surface. The plate permits saw blades to be bent, fitted and secured into the plate grooves to form in an easy and rapid manner a series of concentric circular blades.

Background of the invention

The insulation of pipes, tanks, cylinders, tubes, valves, joints, ducts and the like has in the past created certain problems in regard to the formation of the covering to be applied to the particular surface. The covering of pipes and curvilinear surfaces has, in general, been accomplished by using preformed or molded tubes or other appropriately shaped forms. These coverings are so formed to firmly and snugly fit the surface to be protected in order to ensure maximum effectiveness of insulation, cushioning or other effects.

One known method for the production of pipe insulation segments from block material is to have a table upon which the block material to be cut lies. The table is characterized by an opening through which opening projects one or more arcuate cutting blades. The blade describes a semi-circular arc with reference to the plane of the table. Beneath the surface of the table, the blades are secured to a plate which in turn is secured to an oscillating shaft such as shown by U.S. Patent No. 2,841,-993. When the blades are oscillating, the block-insulating material is passed through them and the semi-circular tubular portions are formed.

The means to secure the blades to the plate is important in order that the arc described by the blades above the surface of the base is as near a perfect semi-circle as possible, to insure that the semi-circular tubular portion cut provides the best possible fit over the pipe to be covered. One method to accomplish this is to have a fixed arcuate rocker arm secured to an oscillating shaft and a series of rocker arm spacers between which are inserted the blades to form arcuate blade lengths and then the whole assembly is rigidly secured as set forth in U.S. Patent No. 3,060,779, entitled, "Cutting Apparatus," issued to P. M. Taft on Oct. 30, 1962. Previous methods have not been entirely satisfactory in that if a series of blades, for example, two, are used for a particular cutting operation and then it is only necessary to remove or add one blade for the next cutting operation such as to change the inside diameter and wall thickness of the next segment to be formed, then often the device must be disassembled which is time consuming and uneconomical.

One means to secure blades to an oscillating plate is to have adjustable mounting connections such as set forth in U.S. Patent No. 2,841,993. This method does not always insure that the arc defined by the saw blade above the horizontal plate of the work table is semi-circular during the cutting operation since it appears in this method only the frictional force of the saw blade edges against the plate and the mounting connections respectively, caused by the force exerted by the clamp, holds the blade in position.

Another method to secure blades to a rotating disc is a drill device as disclosed in U.S. Patent No. 1,283,258. In this method the blades are fitted into circular grooves and then a bolt or similar fastening device passes through the disc to secure the blades thereto. The blades cannot be removed or added individually without disturbing the blades already secured to the plate and the drill device cannot form semi-circular tubular segments.

Summary of the invention

I have discovered a novel apparatus for securing cutting or saw blades to an oscillating plate element wherein the upper portion of the saw blades project above a plane and describe a semi-circular arc which is maintained throughout a cutting operation. One or more saw blades may be secured to the plate in an expeditious manner without disturbing the blades already secured thereto whereby the wall thickness and diameter of the material being cut may be changed quickly.

My invention comprises in combination a base having a flat surface on which the insulating block material is placed. An oscillating shaft is secured to the base beneath the flat surface. A plate is secured to the shaft and is generally perpendicular to the flat surface. The plate is characterized by a series of arcuate parallel grooves therein and a plurality of slots which are generally perpendicular to the grooves.

When two or more blades are secured to the plate, each blade is fitted into a separate groove defining a circle. Each blade is then secured individually to the plate by bolts or other fastening means, the bolts passing through the slots in the plate. The blades form a series of concentric circles with reference to the axis of rotation. The portions of the blades which extend above the flat surface of the base describe a plurality of semi-circular arcs.

When the plate is oscillating, the insulating or block material is passed through the blades whereby tubular segments are formed. Of course, if desired, the blades may be moved through the material, or both the blades and the material may be moved toward one another. If, in the next operation, it is desired to remove a blade so as to change the wall thickness and the inside radius of the tube being formed, the bolts which hold the blade to the plate are removed and the blade extracted from the plate. In the reverse situation to add a blade to the plate, the blade is inserted into a groove in the plate and then secured. In this manner, blades can be removed or added to the plate without disturbing other blades already secured thereto and tubular segments of various dimensions can be formed.

Accordingly, my invention eliminates many of the difficulties associated in the past with the cutting of various sizes of arcuate and particularly troublesome segmental forms by providing an economical and efficient method of rigidly securing blades to an oscillating plate whereby semi-circular arcs are formed for cutting the material and one or more blades may be secured individually or collectively to the plate without removing the other blades already secured thereto, and providing means to rapidly adjust the wall thickness and internal diameter of the tubular portion being cut.

An object of my invention is to provide an improved apparatus for cutting a plurality of tubular segments to be used for pipe insulation from a block of insulating material in different dimensions as to axial cuts but also as to different shapes in the axial or longitudinal direction in straight lines or curved lines.

Another object of my invention is to provide an improved cutting apparatus in which saw blades secured to the plate are independently mounted so that blades may be easily replaced and the settings of one or more blades may be varied as to arcuate length and radius whereby the size and wall thickness of the finished piece can be made to a predetermined specification.

Still another object of the present invention is to provide an improved apparatus for securing blades to an oscillating plate whereby a semi-circular arc is described by the blade in the cutting area.

*Brief description of the drawings*

These and other objects of my invention will be apparent to those persons skilled in the art from the following more detailed description of my invention taken in conjunction with the accompanying drawing wherein:

FIG. 3 is a plan view of a fastening means;
FIG. 4 is a cross-sectional view taken along lines 4—4 of FIG. 1.

*Brief description of the preferred embodiment(s)*

Figure 1:
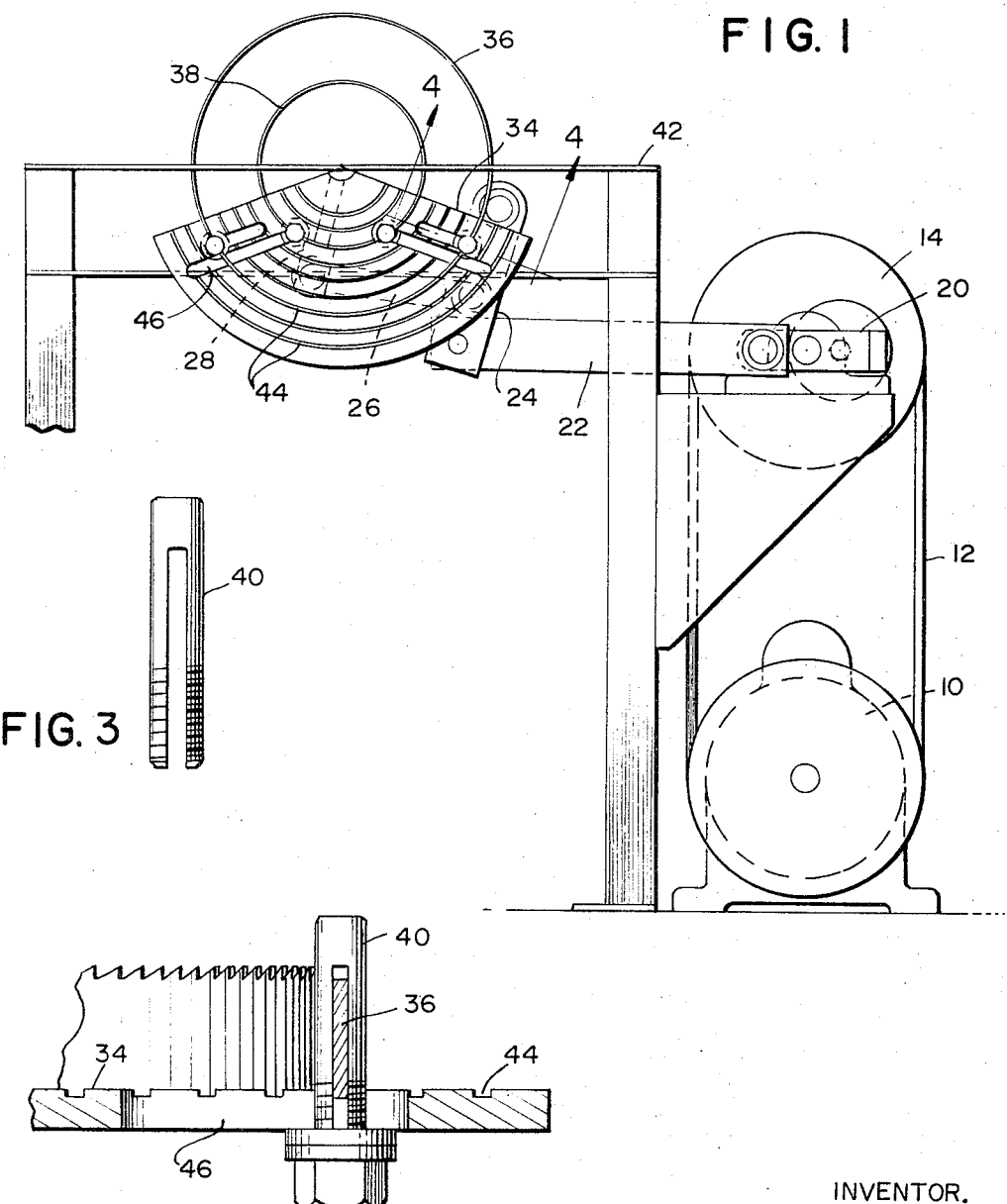
FIG. 1 is a front plan view of my invention.
Figure 2:
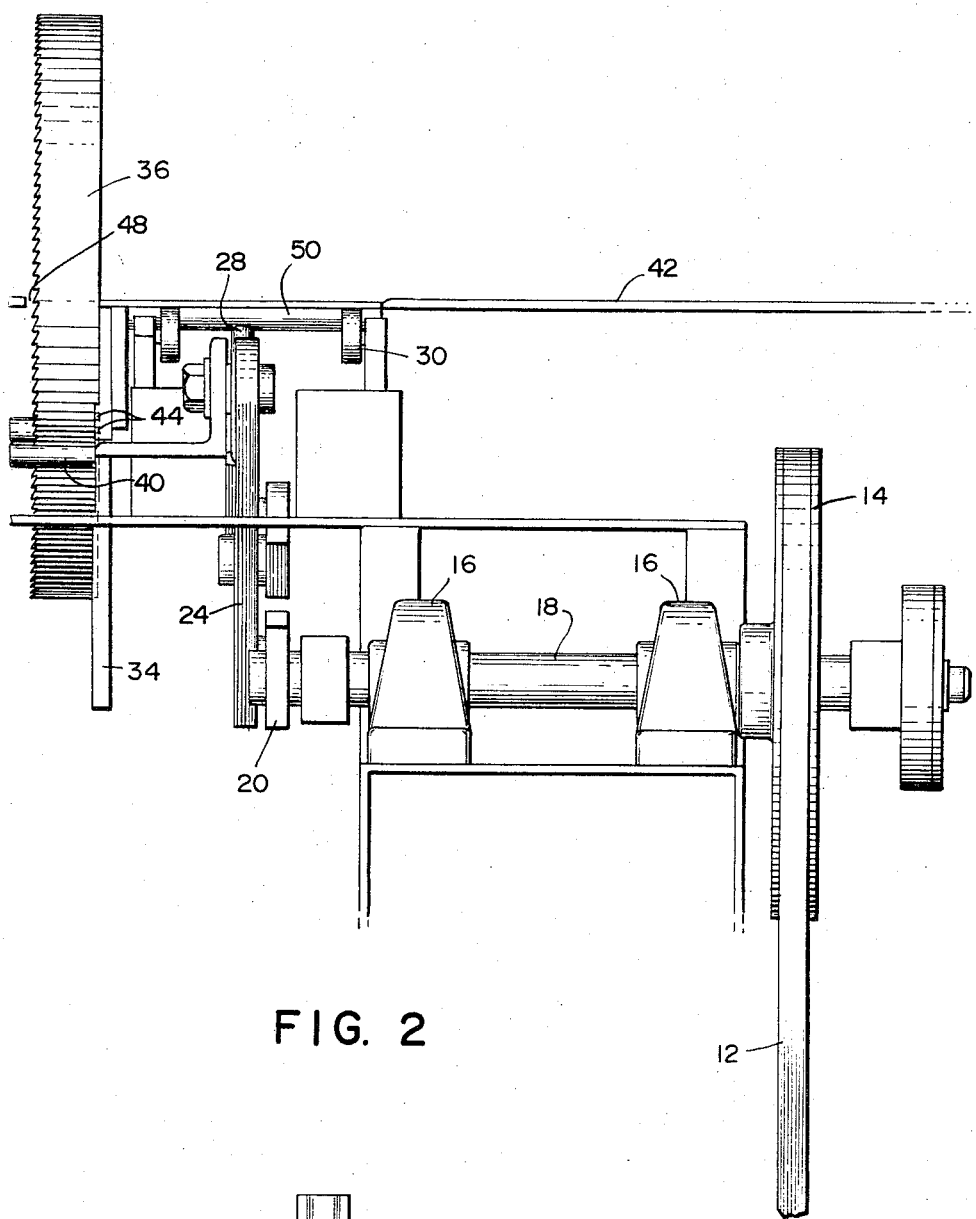
FIG. 2 is an enlarged side view of FIG. 1.

My invention comprises in combination a base with a flat upper surface 42 characterized by an opening 48 therein. Protruding through the said opening are a plurality of blades 36 and 38 describing semi-circular arcs with reference to the plane of the surface 42.

A segmental plate 34 lies just beneath the surface 42 and is characterized by a plurality of arcuate grooves 44 and is further characterized by a plurality of slots 46 which are generally perpendicular to the grooves. Bolts 40 pass through the slots 46 and secure the blades 36 and 38 to the plate 34 which blades are fitted in the grooves 44.

An arcuate concave support base 30 is firmly secured to the bottom of the surface 42. Pivotally mounted in the base 30 is a shaft 50 which shaft is secured to the plate 34. An arm 28 is affixed to the shaft 50. Arms 28, 26, 24 and 22 are pivotally joined in succession as shown in FIG. 1. Arm 22 is pivotally joined to the crank plate 20. A shaft 18 which drives the crank plate 20 passes through pillow blocks 16 and has a pulley 14 secured at the other end thereof. A motor 10 is belted to the pulley 14 to impart rotary motion to the shaft 18.

In the operation of my invention, the blades 36 and 38 are fitted into the grooves 44 in the plate 34 as shown in FIG. 1. Bolts 40 surround the blades and pass through the slots 46 securing the blades to the plate. This is most clearly illustrated in FIG. 4. The blades pass through the opening 48 in the surface 42 describing semi-circular arcs with reference to the plane of the surface 42. The motor 10 belted to the shaft 18 rotates the crank plate 20. The rotary motion of the plate 20 is converted to oscillatory motion and is transmitted to the plate 34 through the arms 22, 24, 26 and 28 and the shaft 50. The plate 34 and therefore the blades 36 and 38 are driven by this oscillatory motion. Block insulating material, to be cut into a semi-circular tubular segment or other curved form, is placed or fed onto the flat surface 42 where a positive manual or mechanical force is placed on the material to propel or guide it in the direction of the oscillating cutting edges of the blades 36 and 38.

After a given operation either of the blades may be individually removed. For example, if it is desired to cut a semi-circular segment with a thinner wall and greater inside diameter, the blade 38 can be taken from the plate 34 by removing the bolts 40 which secure the blade to the plate. A new blade may then be placed in the plate, the ends of the blade fitted into a groove which lies between the groove that the blade 38 was in and the blade 36. This adjustment is made without disturbing the blade 36. It is important to note that with this design, the degree of flexibility in blade adjustment allows tubular segments of various radii and wall thickness in either straight line or curved length to be formed.

The plate 34 is designed in a generally triangular or segmental manner with the apex nearest the flat surface 42 of the base. The degree of oscillation is restricted by the distance the plate can move from one side to another without either side rising above the plane of the flat surface. This design allows a wider degree of oscillation than if a rectangular plate were used. Of course it is understood that a plate of any shape may be successfully employed in my invention as long as the plate, while oscillating, does not project beyond the flat surface of the base. Also, the plate 34 may be characterized by grooves on both sides of the plate so as to provide different spacings between grooves on one side of the plate as opposed to the spacings on the other side.

Figure 5:
FIG. 5 is a plan view taken along lines 4—4 of FIG. 1.

FIGS. 3 and 5 show two types of fastening means which are employed in our invention, however, any suitable fastening means may be used.

The blades 36 and 38 are shown in FIG. 1 fitted into the grooves with their respective ends touching, the blade lengths defining circles. It is not essential that the blade ends meet as shown. As long as the blades are fitted into the grooves, their ends may overlap or be spaced apart and during operation one blade may be used alone or a series of blades may be used.

My invention has been described in particular with the cutting of 180° semi-circular segments. However, tubular segments greater than or less than 180° may be formed. For example, by raising the flat surface or cutting line, on which the block material lies above the axis of rotation or common center of the concentric blades, a tubular segment of less than 180°, say 120°, may be formed. This can be accomplished by securing the oscillating shaft to a level surface below the surface 42 and then surface 42 can be adapted to be either raised or lowered to regulate the depth of the cut in the block material. Also, any means may be used to impart oscillatory motion to the plate element.

The material capable of being cut in the manner described includes insulating material such as magnesia, asbestos, Fiberglas, foam glass, hair felt and the like, plastic and rubber foam materials such as polyether foam, polyurethane, polystyrene, polyethylene, polypropylene, Buna-S, Bucron rubber and the like and other materials capable of being cut or sawed such as wood, plastic and the like.

The blades used in my apparatus are selected based on the nature of the material to be cut or sawed, the speed and accuracy described, and other circumstances. The blade may be a serrated saw blade, a flat blade or even a hot rigid wire could be used.

My invention as described and illustrated, overcomes many of the difficulties associated in the past with oscillatory cutting devices by providing a means wherein blades can be secured to or removed from a plate individually or collectively in an efficient manner to vary the wall thickness and inside diameter of the material being cut, and the blades in the cutting area 1orm and hold during operation, a semi-circular arc.

What is claimed is:
1. An improved oscillatory device for producing arcuate segments from block material which comprises:
 (a) a base having a flat surface;
 (b) a plate element having at least one arcuate groove in at least one face thereof, the plate generally perpendicular to the flat surface of the base and secured to the base for oscillatory motion in reference thereto, the plate formed so that during oscillation the plate does not project beyond the flat surface of the base;

(c) means to impart oscillatory motion to the plate;
(d) a blade element, at least one edge thereof adapted for a cutting action by said oscillation;
(e) means to secure the blade element into the groove thereby forming an arcuate cutting edge projecting above the flat surface; and
(f) means to secure the blade element to the plate.

2. The device of claim 1 wherein the plate element has a series of substantially parallel grooves in at least one face thereof.

3. The device of claim 1 wherein the ends of the blade are fitted into the groove.

4. The device of claim 1 wherein the plate element is an arcuate-shaped plate and the plate is secured to the oscillating means about the radial center thereof, the angular width of the plate sufficient to permit oscillatory motion without the edges of the plate projecting above the surface of the base during operation.

5. The device of claim 1 wherein the groove extends from one to the other end of the plate surface.

6. The device of claim 1 wherein the plate is an arcuate segment and is further characterized by passages therein and means extend through one or more of said passages to secure the blade thereto.

7. The device of claim 6 wherein the passages are radially extending slots.

8. The device of claim 1 wherein the blade is fitted into the groove to form a complete circle.

9. The device of claim 2 wherein a series of thin cutting blades are fitted into the grooves in the plate and form a series of concentric blades with the cutting edges facing in a common direction, the blades separated by a uniform but predetermined spatial distance of the grooves.

10. The device of claim 1 wherein the means to impart oscillatory motion to the plate includes a shaft beneath and horizontal to the surface of the base, a support means for the shaft secured to the base and motive means to impart an oscillatory motion to the shaft, the plate secured to one end of the shaft for motion therewith.

References Cited
UNITED STATES PATENTS 3,060,779  10/1962  Taft _____ 143—85

DONALD R. SCHRAN, *Primary Examiner.*